United States Patent
Goodson et al.

(10) Patent No.: US 8,731,183 B1
(45) Date of Patent: May 20, 2014

(54) SYSTEM AND METHOD FOR CANCELLING ECHO IN A COMMUNICATIONS LINE

(75) Inventors: Richard L. Goodson, Huntsville, AL (US); Daniel M. Joffe, Owens Crossroads, AL (US); Neil M. Jensen, Huntsville, AL (US); Peter S. Kerr, Madison, AL (US)

(73) Assignee: Adtran, Inc., Hunstville, AL (US)

( * ) Notice: Subject to any disclaimer, the term of this patent is extended or adjusted under 35 U.S.C. 154(b) by 1034 days.

(21) Appl. No.: 12/758,132

(22) Filed: Apr. 12, 2010

(51) Int. Cl.
*H04B 3/32* (2006.01)
*G10K 11/175* (2006.01)
*H03G 3/00* (2006.01)

(52) U.S. Cl.
USPC ............... 379/406.01; 379/406.06; 381/71.1; 381/63; 704/200

(58) Field of Classification Search
USPC ............ 379/406.01, 406.06; 381/71.1–71.4, 381/62–63, 56; 704/200, 201, 211–220, 704/270, 275
See application file for complete search history.

(56) References Cited

U.S. PATENT DOCUMENTS

| | | | |
|---|---|---|---|
| 5,533,121 A | 7/1996 | Suzuki et al. | 379/410 |
| 6,240,181 B1 | 5/2001 | Tunstall | 379/410 |
| 6,246,716 B1 | 6/2001 | Schneider | 375/220 |
| 6,259,680 B1 | 7/2001 | Blackwell et al. | 370/286 |
| 6,618,480 B1 | 9/2003 | Polley et al. | 379/406.05 |
| 6,647,115 B2 | 11/2003 | Joffe | 379/398 |
| 6,757,383 B1 | 6/2004 | Joffe | 379/406.01 |
| 6,810,076 B1 | 10/2004 | Tang et al. | 375/219 |
| 6,996,230 B1 | 2/2006 | Chu et al. | 379/406.08 |
| 7,023,963 B1 | 4/2006 | Chu et al. | 379/15.05 |
| 7,039,182 B1 * | 5/2006 | Leonidov et al. | 379/406.05 |
| 7,142,533 B2 | 11/2006 | Ghobrial et al. | 370/352 |
| 7,174,488 B1 | 2/2007 | Chu | 714/712 |
| 7,215,762 B2 | 5/2007 | Fang et al. | 379/398 |
| 7,266,092 B2 | 9/2007 | Schneider et al. | 370/278 |
| 7,333,603 B1 | 2/2008 | Sallaway et al. | 379/391 |
| 7,366,161 B2 | 4/2008 | Mitchell et al. | 370/352 |
| 7,433,365 B1 | 10/2008 | Burch et al. | 370/437 |
| 7,460,498 B2 | 12/2008 | Hunt et al. | 370/286 |

* cited by examiner

*Primary Examiner* — Rasha Al Aubaidi
(74) *Attorney, Agent, or Firm* — Fish & Richardson P.C.

(57) ABSTRACT

An echo canceller system includes a first echo canceller having a first voltage divider and an adaptable second voltage divider that is configured to generate a first replica of an echo. A second echo canceller is configured to generate a second replica of an echo and has tap values that are generated in response to an error signal. A controller is coupled to the first and second echo cancellers and includes a selection algorithm that responds to the tap values of the second echo canceller and selects a voltage divider value for the adaptable second voltage divider.

13 Claims, 3 Drawing Sheets

SYSTEM AND METHOD FOR CANCELLING ECHO IN A COMMUNICATIONS LINE

FIELD OF THE INVENTION

This invention relates to echo canceller systems and related methods.

BACKGROUND OF THE INVENTION

Echo cancellers are used in telephone or similar communication lines and related communications systems to remove the echo from the voice communication and improve voice quality on a telephone call. The Public Switched Telephone Network (PSTN) often generates echo when electrical energy is reflected at a 2W to 4W conversion point. For example, most telephone local loops use two-wire circuits. Transmission facilities, on the other hand, use four-wire circuits. A 2W to 4W converter is used when converting from two-wire to four-wire circuits, which produces echoes.

The magnitude of the echo depends on how well the 2W to 4W converter is set to match the connected 2W facility. To the extent that the match is imperfect, echo becomes part of the telephone communications. Although tolerable in some telephone systems as long as the delay is short, for example, shorter than about 40 milliseconds, the longer delays are distracting and confusing to a far-end speaker. The echo canceller is used towards each end of a path to cancel echo that otherwise would return to the far-end speaker. Some echo cancellers monitor the signals on the received channel of a four-wire circuit and generate estimates of the actual echoes expected to return over the transmit channel.

It is known that full duplex two-wire telecommunications systems use a single wire-pair (two wires) to transmit and receive data, which typically have overlapping spectra or frequency bands. Echo cancellation is also sometimes used to separate the transmitted and received signals to facilitate full duplex data communications. Sometimes the echo cancellation is performed using a full-duplex to half-duplex conversion circuit, for example, a two-wire to four-wire converter or hybrid.

SUMMARY OF THE INVENTION

A system and method of cancelling an echo establishes a telephone connection in a communications line that includes an analog echo canceller having a first voltage divider and a second voltage divider. The digital echo canceller tap values are captured. A new second voltage divider value based on the tap values of the digital echo canceller is selected.

In one example, a first echo canceller includes a first amplifier that receives a downstream analog signal and a second amplifier that receives a portion of the output from the first amplifier and a portion of a return echo signal from remote equipment. The controller is configured to select a balance impedance that reduces the amount of echo upstream through a second amplifier. The second echo canceller comprises a digital echo canceller in one example, and the first echo canceller comprises an analog echo canceller in another example. The selection algorithm is based on a cancellation relation among transfer functions in another example. For example, the cancellation relation comprises $H1-H2_N-H3$. $H1$ represents the transfer function of the first voltage divider. $H2_N$ represents the transfer function of the Nth second voltage divider and $H3$ represents the transfer function of the second echo canceller as a digital echo canceller after the taps have converged.

A method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

The present disclosure generally pertains to an echo canceller system that removes received signal energy as echo from a transmitted signal. Echo typically occurs in a telecommunication system having a single wire pair that provides full-duplex communication path. If a communication link in a telecommunication system has large delays, such as those caused by a large geographic separation of endpoints or due to delays in a Voice over IP (VoIP) link, then even small amount of echo can result in unacceptable communication quality.

Figure 1:
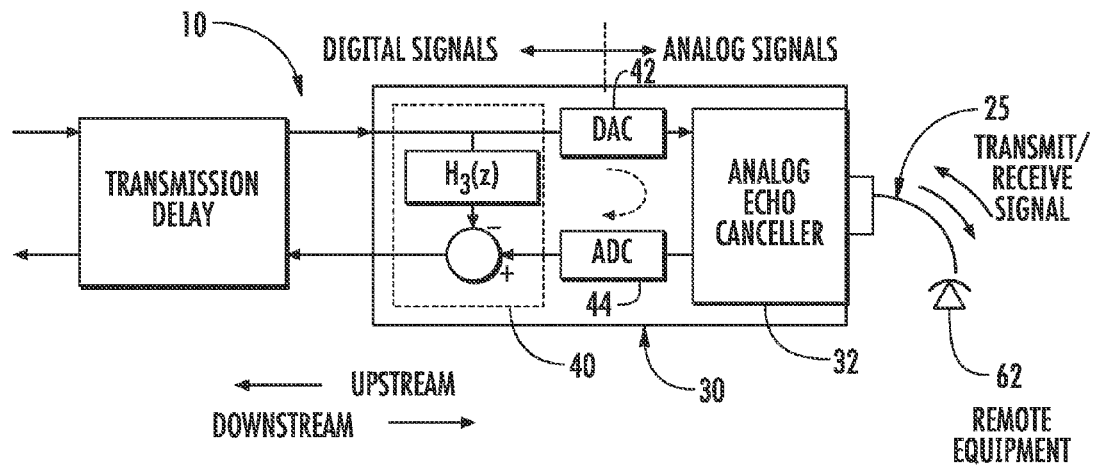
FIG. 1 is a block diagram illustrating a prior art echo canceller system.

FIG. 1 depicts a portion of a telecommunication system 10 where a transmit analog signal and a receive analog signal are simultaneously present on a wire pair 25. Remote equipment 62, such as an analog telephone, receives an analog signal from an upstream (far end) source (not shown) and transmits an analog signal upstream. A portion of the analog signal from the upstream (far end) source returns upstream as an echo. Because echoes are undesirable, a conventional echo canceller system indicated generally at 30 is provided to remove a large portion of the echo. FIG. 1 shows general details of the conventional echo canceller system 30, including a conventional analog echo canceller 32 and a conventional digital echo canceller 40 that interoperate through a digital-to-analog converter (DAC) 42 and analog-to-digital converter (ADC) 44. The analog echo canceller 32 generally removes some of the echo and the digital echo canceller 40 removes much of the remaining echo. If there is substantial misadjustment of the analog echo canceller 32, as will be described, the analog echo canceller may only remove a small portion of the echo. In such a situation, the digital echo canceller 40 would have to remove more of the echo than it would if there were little or no misadjustment.

The digital echo canceller 40, however, has a well-known limitation. Specifically, if the analog echo canceller does not remove enough echo, then the digital echo canceller is unable to remove the remaining echo. In that case, the conventional echo canceller system 30 as shown may not provide a desired amount of echo cancellation, thereby resulting in an undesirable communication connection. Because the impedance characteristics of the wire pair 25 can have a wide range of values, the analog echo canceller must be adjustable to provide adequate echo cancellation for proper operation of the digital echo canceller. The problem to be solved is to adjust the analog echo canceller without a priori knowledge of the impedance characteristics of the wire pair and without having undesirable impact on the service.

Figure 2:
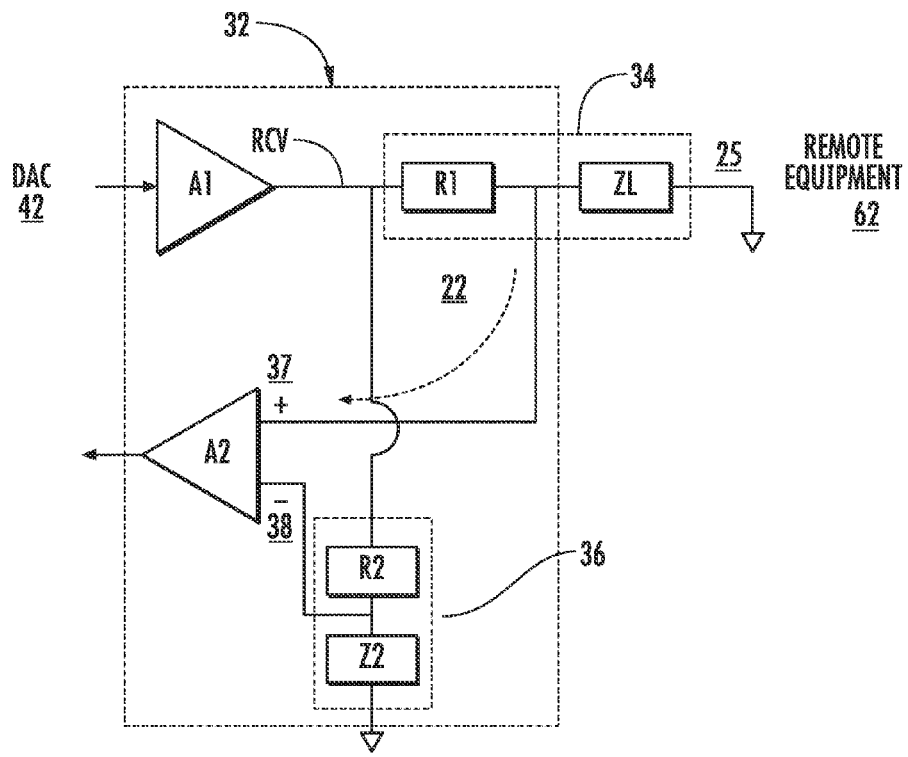
FIG. 2 is a block diagram illustrating a prior art analog echo canceller.

In order to better understand the shortcomings of the conventional echo canceller system 30 such as shown in FIG. 1, a conventional analog echo canceller circuit indicated generally at 32 is depicted in FIG. 2. Amplifier A1 receives a downstream analog signal from the digital-to-analog converter (DAC) 42 and provides an output signal RCV that is directed towards the remote equipment 62. The output signal, RCV, is coupled to the remote equipment through R1 and ZL, where ZL represents the impedance looking into wire pair 25. The combination of R1 and ZL form a voltage divider, so that a portion of RCV is coupled, as an echo signal 22, to the positive terminal of amplifier A2. The portion of the RCV directed towards A2 by the first voltage divider 34 is combined with a transmit signal from the remote equipment 62. The desired output of A2 is the transmit signal with no echo. Hence it is necessary to remove the echo by creating a replica of the echo and subtracting the replica from the echo. The replica is provided by a second voltage divider 36 that includes R2 and Z2, whose output is coupled to the negative terminal 38 of amplifier A2. Because of component variations and the range of variations of ZL, the replica formed by the second voltage divider 36 is generally an approximation of the echo. When the first voltage divider 34 does not have the same divider characteristics as the second voltage divider, the condition is described as a misadjustment.

Figure 3:
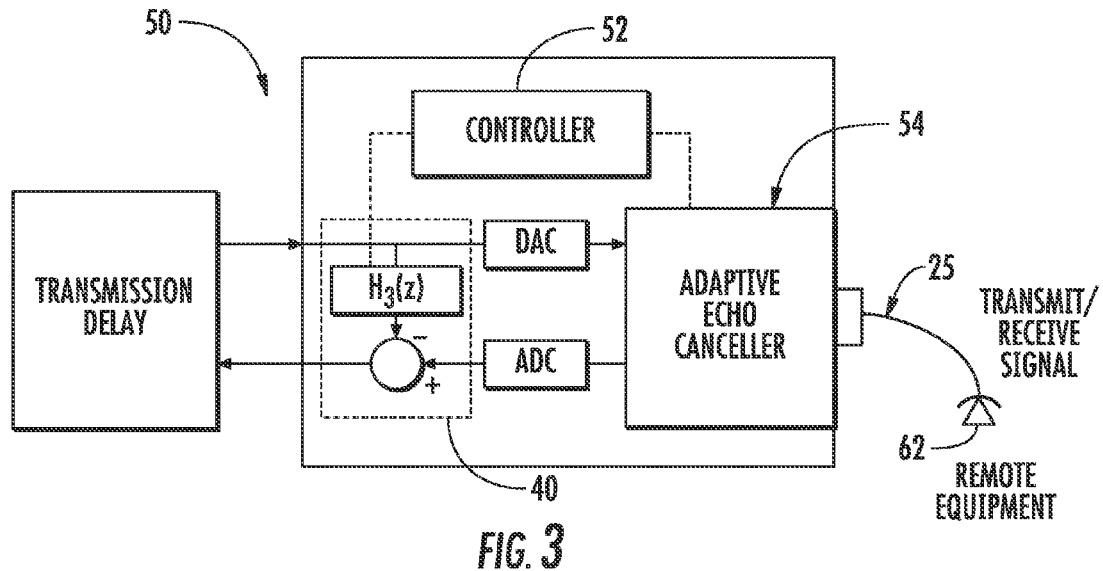
FIG. 3 is a block diagram depicting an embodiment of an echo canceller system in accordance with a non-limiting example.
Figure 4:
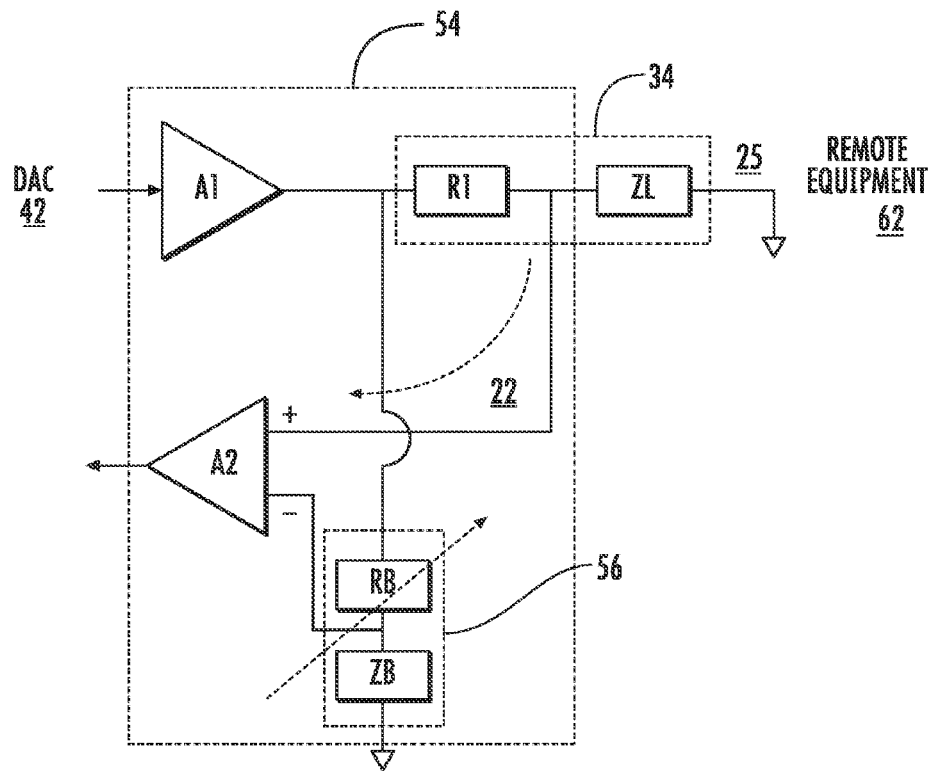
FIG. 4 depicts an embodiment of an adaptable analog echo canceller used in the echo canceller system of FIG. 3 in accordance with a non-limiting example.

FIG. 3 is another block diagram showing an embodiment of an improved echo canceller indicated generally at 50 in accordance with non-limiting examples. A controller 52 is provided that selects a balance impedance, as will be described, for reducing the amount of echo going upstream through amplifier A2. When the amount of echo going upstream through A2 is reduced by the improved echo canceller 50, the digital echo canceller 40 has the capability to remove, i.e., cancel, more of the echo energy headed in the upstream direction than with a conventional echo canceller. The improved echo canceller system 50 has an adaptive echo canceller indicated generally at 54. The adaptive echo canceller 54 has a first voltage divider 34 and an adaptive voltage divider 56 as depicted in FIG. 4. The adaptive voltage divider 56 selects a voltage divider value from a set of voltage divider values in response to tap values of the digital echo canceller 40. The voltage divider values could be from selected circuits that impart a voltage divider value or from other circuit or logic or other configurations that divide voltages, including analog or digital circuits. Logic within the controller 52 implements a selection algorithm. Other embodiments are possible using other analog echo cancellers and digital echo cancellers.

The selection algorithm is based on the cancellation relation $H1-H2_N-H3=0$, where $H1$, $H2_N$ and $H3$ represent transfer functions. $H1$ represents the transfer function of the first voltage divider, $H2_N$ represents the transfer function of the Nth second voltage divider, and $H3$ represents the transfer function of the digital echo canceller after the taps have converged. Hence, if H3 is known and $H2_N$ is known, then H1 is determined using the above cancellation relation. A new second voltage divider $H2_N$ is then selected to minimize the magnitude of $H_1-H2_N$ by using a coefficient matching technique. Details of one such technique is provided in a later detailed example. The improved echo canceller system 50 uses the above-described relationships to select a second voltage divider value, from a set of available values of dividers that best matches the characteristics of the first voltage divider. The selection algorithm compares the digital representation, a set of numbers, of H1 with each of the $H2_N$'s, another set of numbers, so that the magnitude of the $H1-H2_N$ is minimized.

Figure 5:
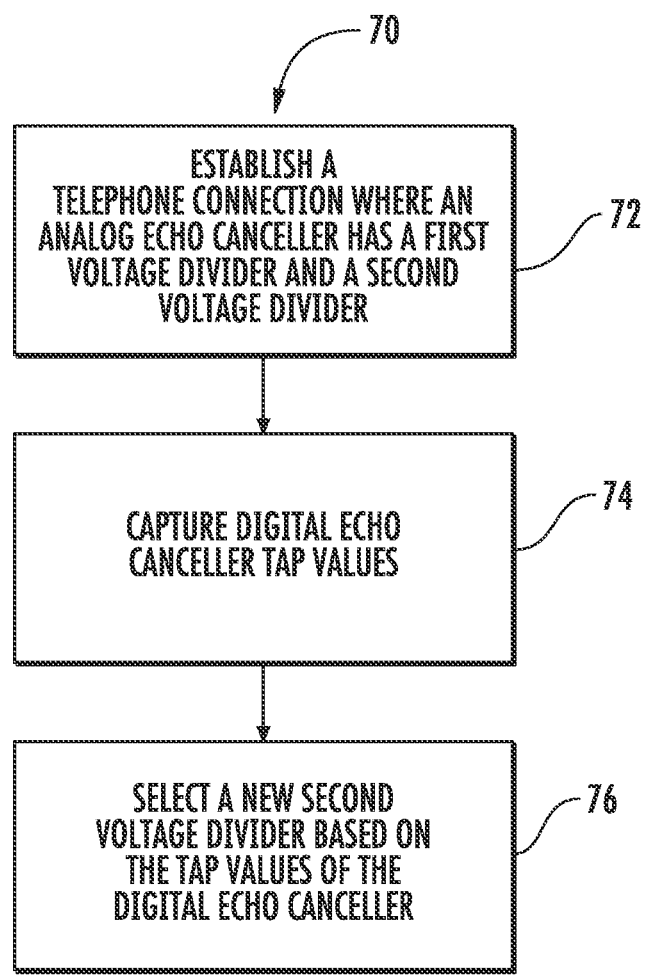
FIG. 5 is a flowchart representing a method embodiment of the echo canceller system of FIG. 3 in accordance with a non-limiting example.

FIG. 5 depicts a method embodiment 70 of the improved echo canceller 50.

As shown in FIG. 5 and beginning at block 72, a telephone connection is established where an analog echo canceller has a first voltage divider and a second voltage divider. The digital echo canceller tap values are captured (block 74). A new second voltage divider is selected based on the tap values of the digital echo canceller (block 76).

There now follows an example of adjusting the analog echo canceller as a non-limiting example and for showing what can be accomplished. For example, it is possible that an assumption can be made that the system has converged, i.e., that $H1-H2_N-H3=0$. In that case, the system knows H3 based on the digital echo canceller taps and $H2_N$ based on the analog echo canceller setting. The system calculates H1 as the echo transfer function, which the analog echo canceller attempts to cancel. Once the system knows H1, it can off-line calculate which $H2_N$ is closest to H1, providing the best cancellation. This provides the best adjustment with the fewest measurements. As an alternative, it is possible by knowing H1 for the system to match it against a table of $H2_N$ values, picking the $H2_N$ that most closely matched H1. Different techniques can be used to select H2. It is possible to use hardware and software control of H2 switching. It is possible to construct sets of coefficients corresponding to a variety of loops and set H1=0 and H3=0 and find the impulse response of H2.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An echo canceller system, comprising:
   a first echo canceller having a first voltage divider and an adaptable second voltage divider that is configured to generate a first replica of an echo;
   a second echo canceller that is configured to generate a second replica of an echo, the second echo canceller having tap values that are generated in response to an error signal; and
   a controller coupled to the first and second echo cancellers, wherein said controller includes a selection algorithm selects a voltage divider value for the adaptable second voltage divider based on the tap values of the second echo canceller.

2. The echo canceller system according to claim 1, wherein said first echo canceller comprises a first amplifier that receives a downstream analog signal and a second amplifier that receives a portion of an output from the first amplifier and a portion of a return echo signal from remote equipment.

3. The echo canceller system according to claim 2, wherein said controller is configured to select a balance impedance that reduces an amount of echo upstream through the second amplifier.

4. The echo canceller system according to claim 1, wherein said second echo canceller comprises a digital echo canceller.

5. The echo canceller system according to claim 1, wherein said first echo canceller comprises an analog echo canceller.

6. The echo canceller system according to claim 1, wherein said selection algorithm is based on a cancellation relation among transfer functions.

7. An echo canceller system comprising:
a first echo canceller having a first voltage divider and an adaptable second voltage divider that is configured to generate a first replica of an echo;
a second echo canceller that is configured to generate a second replica of an echo, the second echo canceller having tap values that are generated in response to an error signal; and
a controller coupled to the first and second echo cancellers, wherein
said controller includes a selection algorithm selects a voltage divider value for the adaptable second voltage; and
said selection algorithm is based on a cancellation relation of $H1-H2_N-H3$, and $H1$ represents a transfer function of the first voltage divider, $H2_N$ represents a transfer function of an Nth second voltage divider and $H3$ represents a transfer function of the second echo canceller as a digital echo canceller after the taps have converged.

8. A method of cancelling an echo, which comprises:
capturing digital echo canceller tap values of a digital echo canceller; and
selecting a voltage divider value for an analog echo canceller based on the tap values of the digital echo canceller.

9. The method according to claim 8, which further comprises receiving a downstream analog signal at a first amplifier and receiving a portion of an output from the first amplifier and a portion of a return echo signal from remote equipment at a second amplifier.

10. The method according to claim 9, which further comprises selecting a balance impedance that reduces an amount of echo upstream through the second amplifier.

11. The method according to claim 8, which further comprises selecting a cancellation relation among transfer functions for adjusting a new second voltage divider value.

12. A method of cancelling an echo, comprising:
establishing a telephone connection in a communications line that includes an analog echo canceller having a first voltage divider and a second voltage divider;
capturing digital echo canceller tap values;
selecting a new second voltage divider value based on the tap values of the digital echo canceller; and
selecting a cancellation relation among transfer functions for adjusting a new second voltage divider value, wherein said cancellation relation comprises $H1-H2_N-H3$, and $H1$ represents the transfer function of the first voltage divider, $H2_N$ represents the transfer function of an nth second voltage divider and $H3$ represents the transfer function of a second echo canceller as a digital echo canceller after the taps have converged.

13. A device comprising:
a controller input that is configured to connect to a digital echo canceller and receive tap values of the digital echo canceller;
a controller output that is configured to connect to an adaptive echo canceller; and
logic configured to select a voltage divider value for the adaptive echo canceller based on the tap values received through the controller input and output the selected voltage divider output on the controller output.

* * * * *

UNITED STATES PATENT AND TRADEMARK OFFICE
CERTIFICATE OF CORRECTION

| | | |
|---|---|---|
| PATENT NO. | : 8,731,183 B1 | Page 1 of 1 |
| APPLICATION NO. | : 12/758132 | |
| DATED | : May 20, 2014 | |
| INVENTOR(S) | : Richard Goodson et al. | |

It is certified that error appears in the above-identified patent and that said Letters Patent is hereby corrected as shown below:

On the Title Page, Item (73) (Assignee), Delete "Hunstville," and insert -- Huntsville, --, therefor.

In the Claims

In Column 6, In Line 24, In Claim 12, delete "nth" and insert -- Nth --, therefor.

Signed and Sealed this
Twenty-seventh Day of January, 2015

Michelle K. Lee
*Deputy Director of the United States Patent and Trademark Office*